United States Patent
Suzuki et al.

(10) Patent No.: US 7,126,783 B2
(45) Date of Patent: Oct. 24, 2006

(54) DISK DRIVE APPARATUS, SERVO CONTROL CIRCUIT, METHOD OF MANUFACTURING RECORDING MEDIUM, MAGNETIC RECORDING MEDIUM, AND METHOD OF CHECKING RECORDING MEDIUM

(75) Inventors: Hiroyuki Suzuki, Kawasaki (JP); Arata Ejiri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/156,759

(22) Filed: Jun. 20, 2005

(65) Prior Publication Data

US 2005/0226110 A1    Oct. 13, 2005

Related U.S. Application Data

(63) Continuation of application No. PCT/JP03/08044, filed on Jun. 25, 2003.

(51) Int. Cl.
*G11B 5/02* (2006.01)
(52) U.S. Cl. .......................................... 360/75; 360/17
(58) Field of Classification Search .................. None
See application file for complete search history.

(56) References Cited

U.S. PATENT DOCUMENTS

| | | | | |
|---|---|---|---|---|
| 5,553,086 A | * | 9/1996 | Sompel et al. | 360/75 |
| 2002/0018378 A1 | | 2/2002 | Mine | |
| 2005/0128617 A1 | * | 6/2005 | Kuroda et al. | 360/48 |

FOREIGN PATENT DOCUMENTS

| | | |
|---|---|---|
| JP | 4-251440 | 9/1992 |
| JP | 11-003574 | 1/1999 |
| JP | 11-224474 | 8/1999 |
| JP | 2002-25054 | 1/2002 |
| JP | 2002-373417 | 12/2002 |

* cited by examiner

*Primary Examiner*—Hoa T. Nguyen
*Assistant Examiner*—James L Habermehl
(74) *Attorney, Agent, or Firm*—Greer, Burns & Crain, Ltd.

(57) ABSTRACT

A disk drive apparatus that performs a positioning of a head based on servo information recorded on a recording medium includes a servo control unit that performs a servo control based on a set of pieces of servo information selected from a plurality of sets of pieces of servo information recorded on the recording medium.

7 Claims, 10 Drawing Sheets

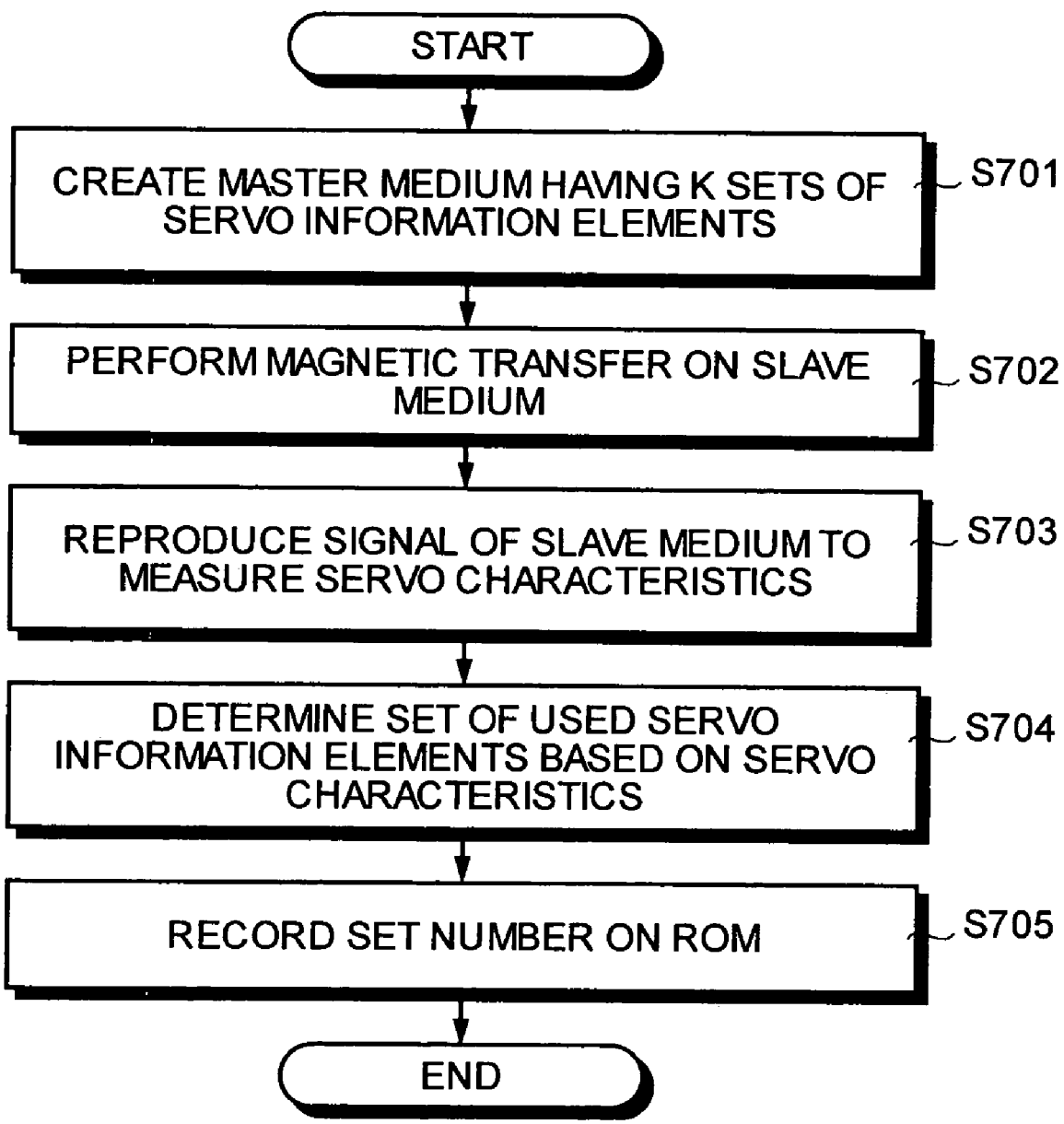

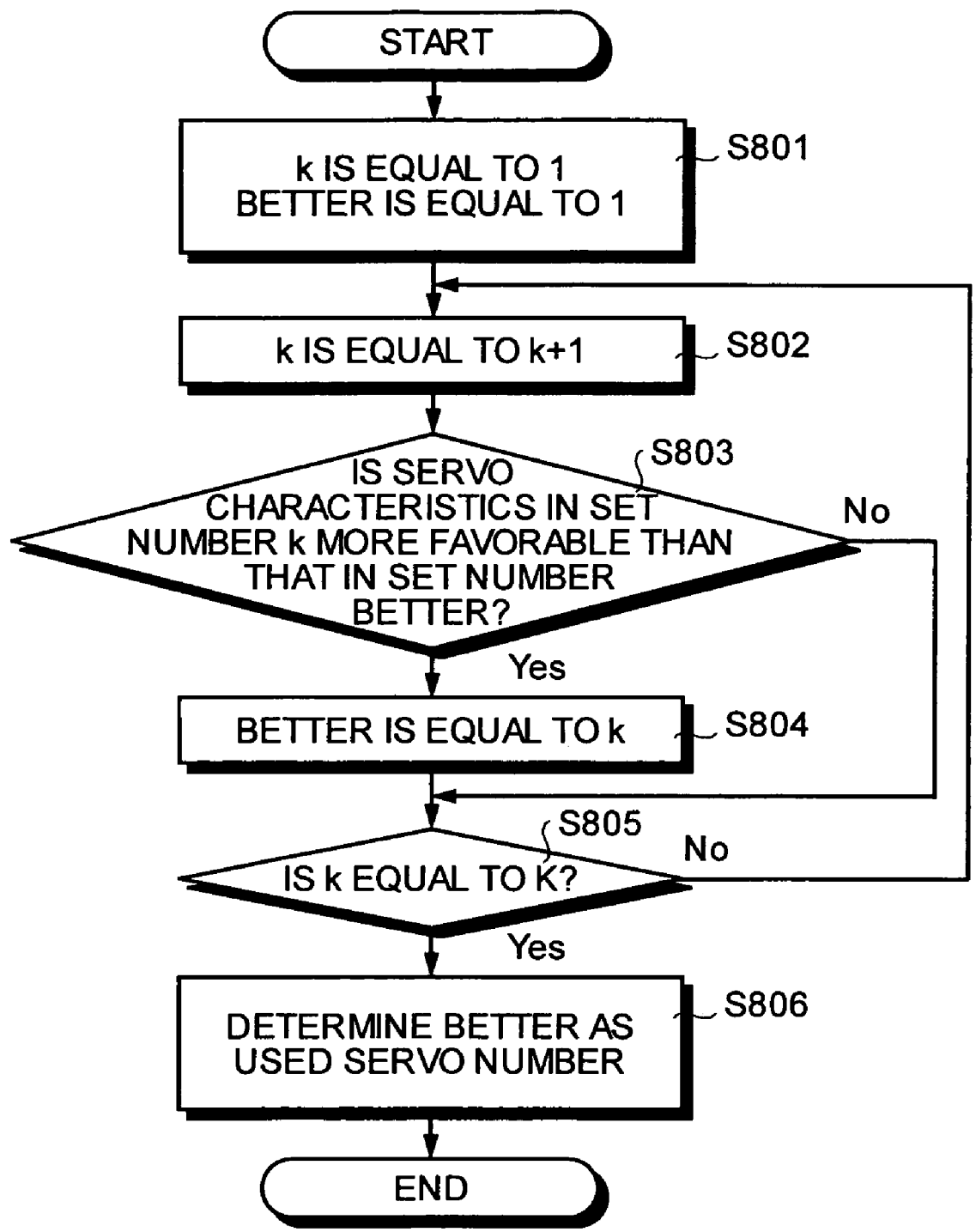

FIG.9A
BEFORE DETERMINATION OF USED SERVO INFORMATION NUMBER k
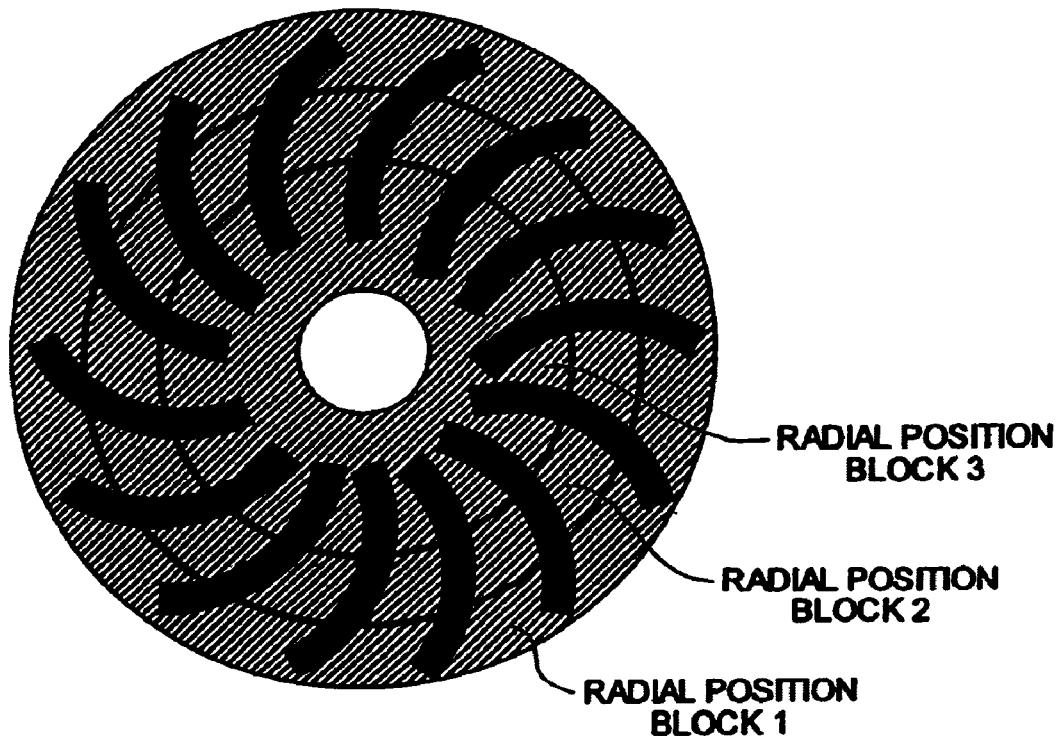
— RADIAL POSITION BLOCK 3
— RADIAL POSITION BLOCK 2
— RADIAL POSITION BLOCK 1
AFTER DETERMINATION OF USED SERVO INFORMATION NUMBER k
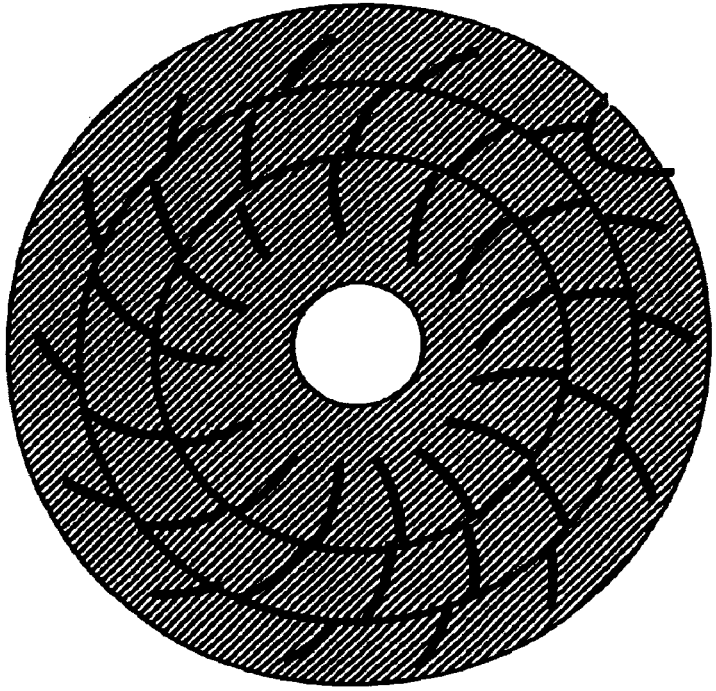
FIG.9B

DISK DRIVE APPARATUS, SERVO CONTROL CIRCUIT, METHOD OF MANUFACTURING RECORDING MEDIUM, MAGNETIC RECORDING MEDIUM, AND METHOD OF CHECKING RECORDING MEDIUM

This is continuation of PCT International Application No. PCT/JP2003/008044, filed Jun. 25, 2003.

BACKGROUND OF THE INVENTION

1) Field of the Invention

The present invention relates to a disk drive apparatus and a servo control circuit that perform positioning of a head using servo information recorded on a recording medium, a method of manufacturing a recording medium, a magnetic recording medium, and a method of checking a recording medium, and more particularly, to a disk drive apparatus and a servo control circuit that can improve the quality of servo information used for servo control and can prevent performance degradation and follow-up control failure due to defective servo information, a method of manufacturing a recording medium for disk apparatuses, a magnetic recording medium, and a method of checking a recording medium.

2) Description of the Related Art

In recent years, mass storage volume of a magnetic disk apparatus used as a storage apparatus for computers or audio-visual (AV) equipment is advancing significantly. The mass storage volume is realized owing to increase in data recording density in a magnetic disk, and a recording density of servo information has also been increased along with the increase in data recording density in a magnetic disk.

The term "servo information" means information recorded on a magnetic disk of a magnetic disk apparatus in advance, and it is information read at fixed intervals by a magnetic head to be used for positioning the magnetic head.

While the servo information is written on a track of a magnetic disk at fixed intervals by the same element number as the number of sectors using an exclusive apparatus called "servo writer", after the magnetic disk has been assembled in a magnetic disk apparatus, the time required for writing servo information is increased according to the increase in recording density of servo information. This results in reduction in productivity of the magnetic disk apparatus.

In view of these circumstances, a magnetic transfer technique that collectively records servo information on a magnetic disk using an apparatus called "a magnetic transfer apparatus" has been developed in order to solve the problem about increase in the time for writing servo information.

In the magnetic transfer, the time for writing servo information can be reduced by applying direct magnetization to a master medium recorded with servo information in advance and a slave medium to be written with the servo information that is brought in close contact with each other to perform collective transfer of the servo information (see, for example, Japanese Patent Application Laid-open No. H4-251440).

Furthermore, techniques for detecting transfer defects before and after magnetic transfer, such as a foreign material check for checking whether foreign material is on a slave medium or a read-write check for writing a signal on a slave medium and reading it therefrom, have been developed (see, for example, Japanese Patent Application Laid-open No. 2002-25054).

In the conventional magnetic transfer system, however, when there is any omission in servo information after being transferred, a sector corresponding to the servo information becomes unusable. Accordingly, there is a problem that performance degradation due to a skip processing to the unusable sector or the like, or follow-up control failure occurs.

SUMMARY OF THE INVENTION

It is an object of the present invention to at least solve the problems in the conventional technology.

A disk drive apparatus according to one aspect of the present invention, which performs a positioning of a head based on servo information recorded on a recording medium, includes a servo control unit that performs a servo control based on a set of pieces of servo information selected from a plurality of sets of pieces of servo information recorded on the recording medium.

A servo control circuit according to another aspect of the present invention, which is for a disk drive apparatus, includes a servo-information-identifier storing circuit that stores an identifier for identifying a set of pieces of servo information to be used for the servo control from among a plurality of sets of pieces of servo information recorded on a recording medium; a servo-information selecting circuit that selects the set of pieces of servo information to be used from among the sets of pieces of servo information based on the identifier stored; and a position control circuit that controls a position of a head of the disk drive apparatus based on the set of pieces of servo information selected.

A method according to still another aspect of the present invention, which is for manufacturing a recording medium, includes determining a set of pieces of servo information to be used from a plurality of sets of pieces of servo information that is recorded on a master medium; and creating a slave medium on which the sets of pieces of servo information is recorded by transferring the sets of pieces of servo information by using the master medium.

A method according to still another aspect of the present invention, which is for manufacturing a recording medium, includes creating a slave medium on which a plurality of sets of pieces of servo information is recorded by transferring the sets of pieces of servo information using a master medium on which the sets of pieces of servo information is recorded; and determining a set of pieces of servo information to be used from the sets of pieces of servo information.

A magnetic recording medium according to still another aspect of the present invention has a plurality of sets of pieces of servo information is recorded. A set of pieces of servo information selected from among the sets of pieces of servo information, based on a result of checking the sets of pieces of servo information recorded, is used for positioning a magnetic head by a magnetic-disk drive apparatus.

A method according to still another aspect of the present invention, which is for checking a recording medium having a plurality of sets of pieces of servo information, includes detecting a defect on the recording medium; and selecting a set of pieces of servo information to be used from among the sets of pieces of servo information, based on a position of the defect.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 7 is a flowchart of a magnetic transfer procedure performed when a set of pieces of servo-information based on servo characteristics of a slave medium;

FIG. 8 is a flowchart of a processing procedure of a servo-information determining process based on the servo characteristics;

FIGS. 9A and 9B are explanatory diagrams of a case that different sets of pieces of servo information are used according to radial positions.

DETAILED DESCRIPTION

Exemplary embodiments of a disk drive apparatus, a servo control circuit, a method of manufacturing a recording medium, a magnetic recording medium, and a method of checking a recording medium according to the present invention will be explained below in detail with reference to the accompanying drawings.

Figure 1:
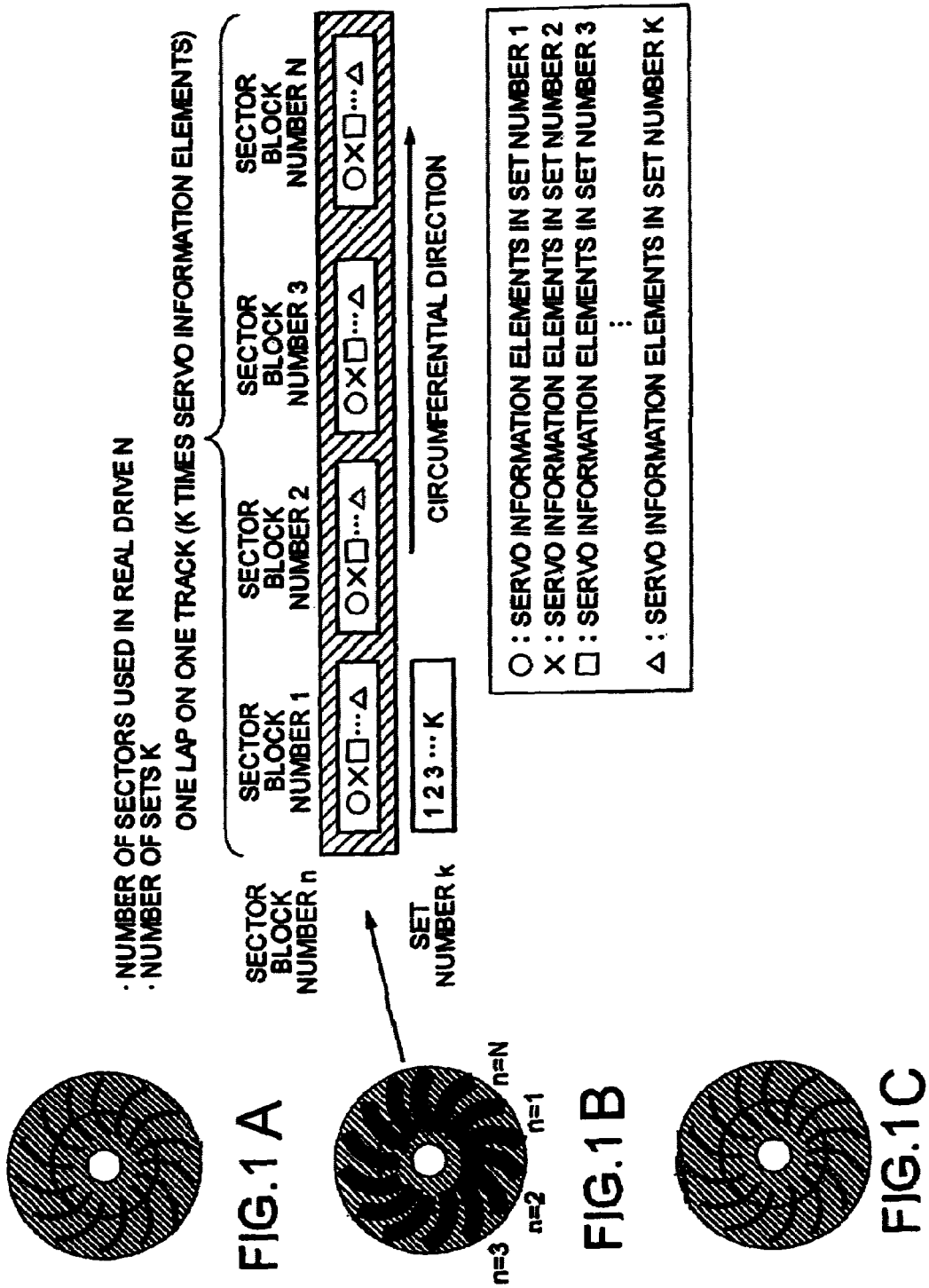
FIGS. 1A to 1C are explanatory diagrams of a concept of a plurality of servo information elements according to an embodiment of the present invention.

FIGS. 1A to 1C are explanatory diagrams of a concept of a plurality of sets of pieces of servo information according to the embodiment. As shown in FIG. 1A, servo information elements of the same number as the number of sectors are transferred on a slave medium in a conventional magnetic transfer.

On the other hand, as shown in FIG. 1B, a master medium has a plurality of sets of pieces of servo information and the sets of pieces of servo information are transferred on a slave medium in a magnetic transfer according to the embodiment. That is, K servo information elements having set numbers 1 to K are transferred on each sector on the slave medium.

The magnetic-disk drive apparatus selects and uses a set of pieces of servo information that do not include any failure in the entire sector or a set of pieces of servo information whose servo characteristic is the most favorable from the K sets of pieces of servo information. Accordingly, as shown in FIG. 1C, the number of servo information elements, after a set number of servo information elements to be used is selected, becomes equal to the number of sectors like the conventional servo information elements.

Thus, according to the embodiment, K sets of pieces of servo information are created on a master medium, and a slave medium having K sets of pieces of servo information is created using the master medium. The magnetic-disk drive apparatus can prevent performance degradation and follow-up control failure due to a defective servo information element(s), by using a set of pieces of servo information that do not include any defect or a set of pieces of servo information whose servo characteristic is the most favorable from the K sets of pieces of servo information.

Constitutions of a servo-information analyzing apparatus and the magnetic-disk drive apparatus according to the embodiment will be explained next. The servo-information analyzing apparatus detects a defect in a master medium or a slave medium, and determines a set number of servo information elements to be used by the magnetic-disk drive apparatus from the K sets of pieces of servo information based on a position of the detected defect.

Figure 2:
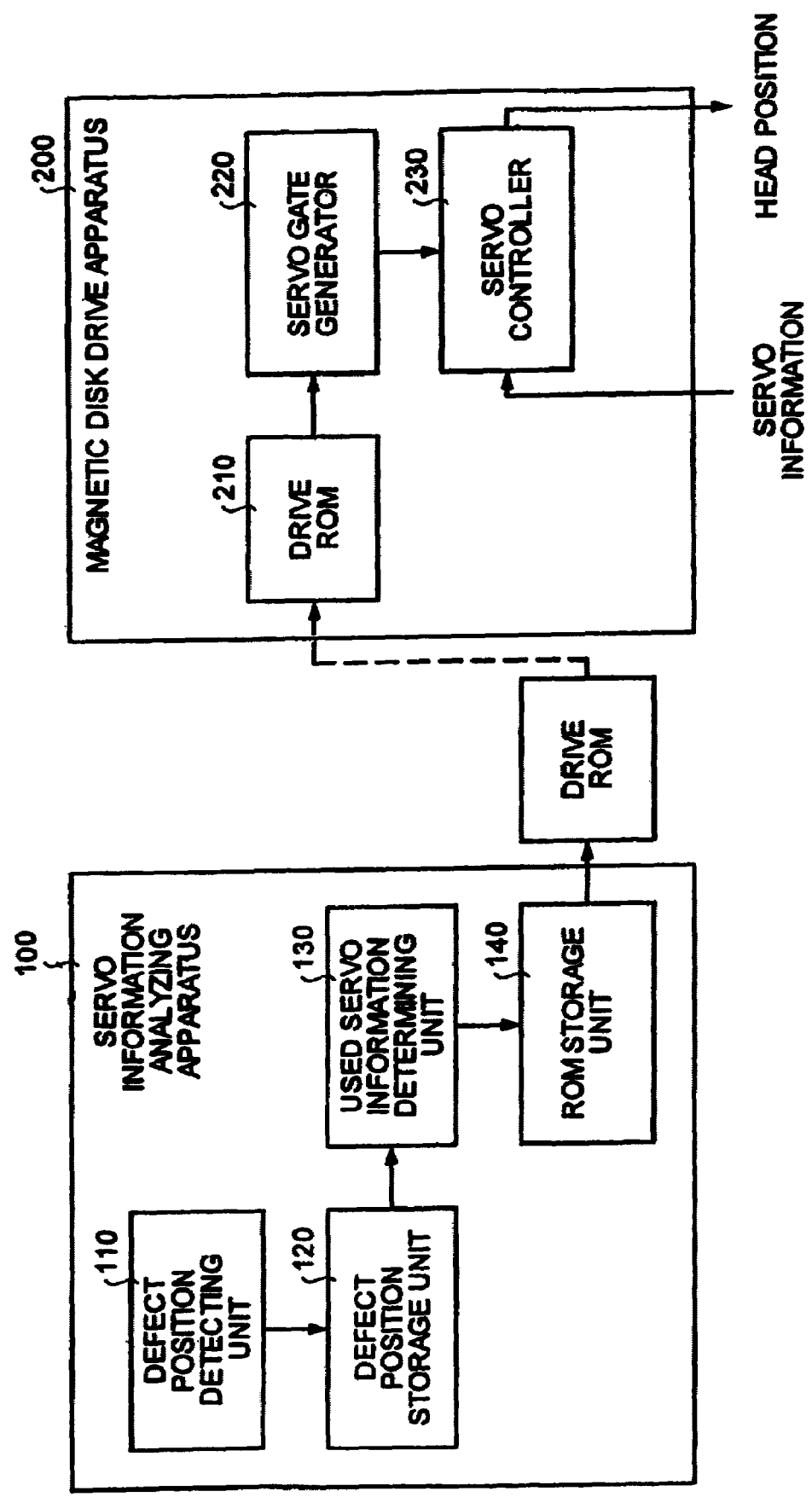
FIG. 2 is a functional block diagram of constitutions of a servo-information analyzing apparatus and a magnetic-disk drive apparatus according to the embodiment.

FIG. 2 is a functional block diagram of constitutions of a servo-information analyzing apparatus and a magnetic-disk drive apparatus according to the embodiment. As shown in FIG. 2, a servo-information analyzing apparatus 100 has a defect-position detecting unit 110, a defect-position storing unit 120, a servo-information determining unit 130, and a read-only memory-(ROM) writing unit 140. A magnetic-disk drive apparatus 200 includes a drive ROM 210, a servo-gate generator 220, and servo controller 230.

The defect-position detecting unit 110 is a sensor that detects defect/dust on a master medium or a slave medium, and it detects defects/dusts on the entire position on which K sets of pieces of servo information is recorded.

The defect-position storing unit 120 stores therein position information about defect/dust on a master medium or a slave medium detected by the defect-position detecting unit 110. A servo information element stored at the defect-position storing unit 120 becomes defective.

The servo-information determining unit 130 is a processor that determines a set number of a set of pieces of servo information where a defective servo information element is not present, based on position information about defect/dust stored in the defect-position storing unit 120. The servo-information determining unit 130 determines the set number of servo information elements where a defective servo information element is not present from the K sets of pieces of servo information so that the magnetic-disk drive apparatus 200 can use a servo information that does not include any defect.

The ROM writing unit 140 is a processor that writes the set number determined by the servo-information determining unit 130 in the drive ROM 210, so that the magnetic-disk drive apparatus 200 can use the analysis result obtained by the servo-information analyzing apparatus 100.

The drive ROM 210 is a storage unit on which the set number that the servo-information determining unit 130 has determined is stored, and the drive ROM 210 is used, while it is incorporated in the magnetic-disk drive apparatus 200. While the set number determined by the servo-information determining unit 130 is stored in the drive ROM 210 and utilized by the magnetic-disk drive apparatus 200, a drive jumper pin can be also used instead of the drive ROM 210.

The servo-gate generator 220 is a gate signal generator that recognizes a servo information element about the set number stored in the drive ROM 210 according to a producing signal from the slave medium to generate servo gates at equal intervals corresponding to the storage positions of servo information elements to be used.

Figure 3:
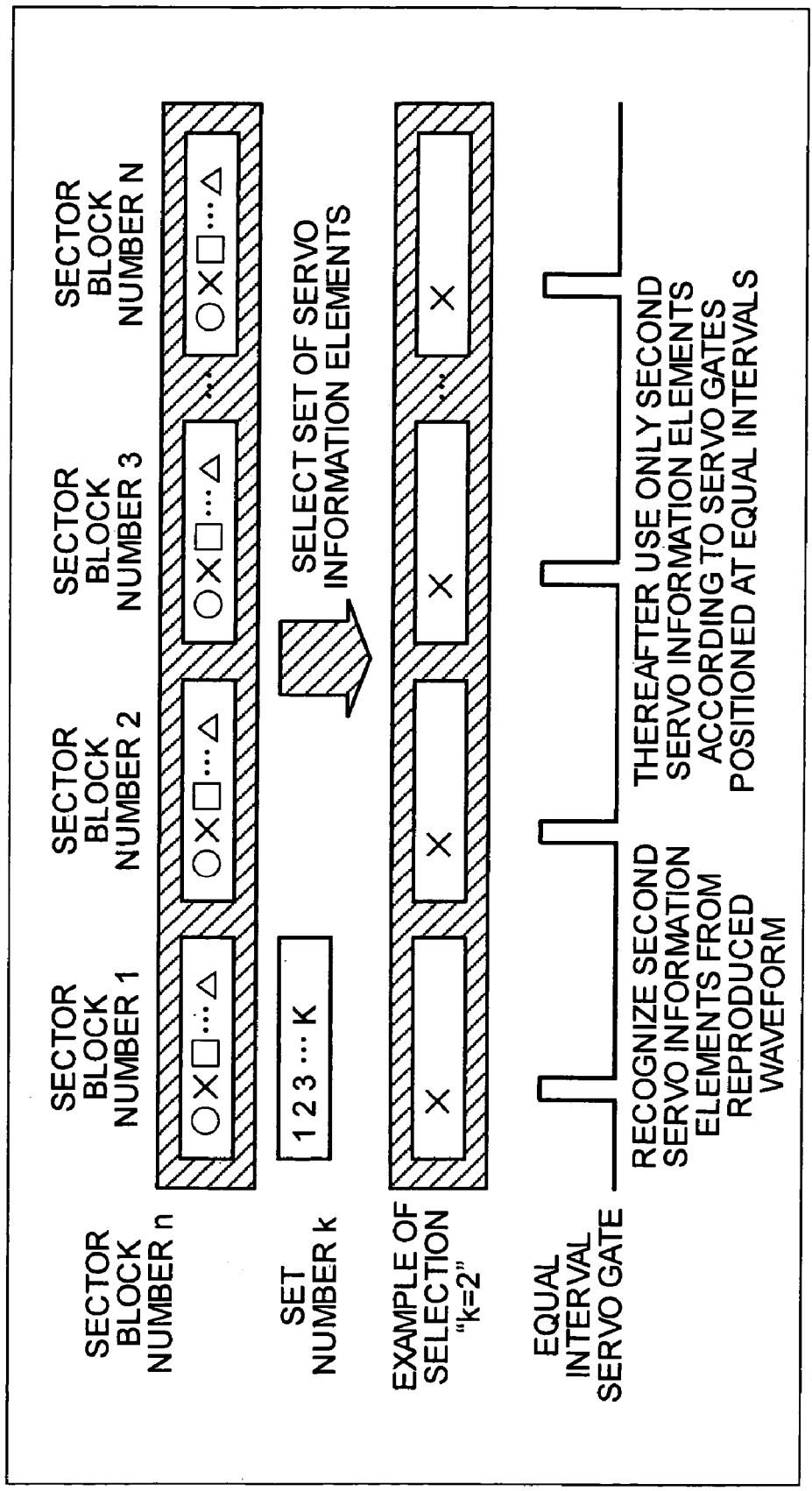
FIG. 3 is an explanatory diagram of servo gates that is generated by a servo-gate generator.

FIG. 3 is an explanatory diagram of servo gates that is generated by the servo-gate generator 220. As shown in FIG. 3, when using servo information elements included in "the set number 2", the servo-gate generator 220 generates servo gates at equal intervals, corresponding to the position where the second servo information element is stored.

The servo controller 230 is a processor that performs servo control corresponding to the servo gates that is generated by the servo-gate generator 220. The servo controller 230 performs the servo control corresponding to the servo gates, so that servo control can be performed by using only servo information elements of the set number that the servo-information analyzing apparatus 100 has determined.

Figure 4:
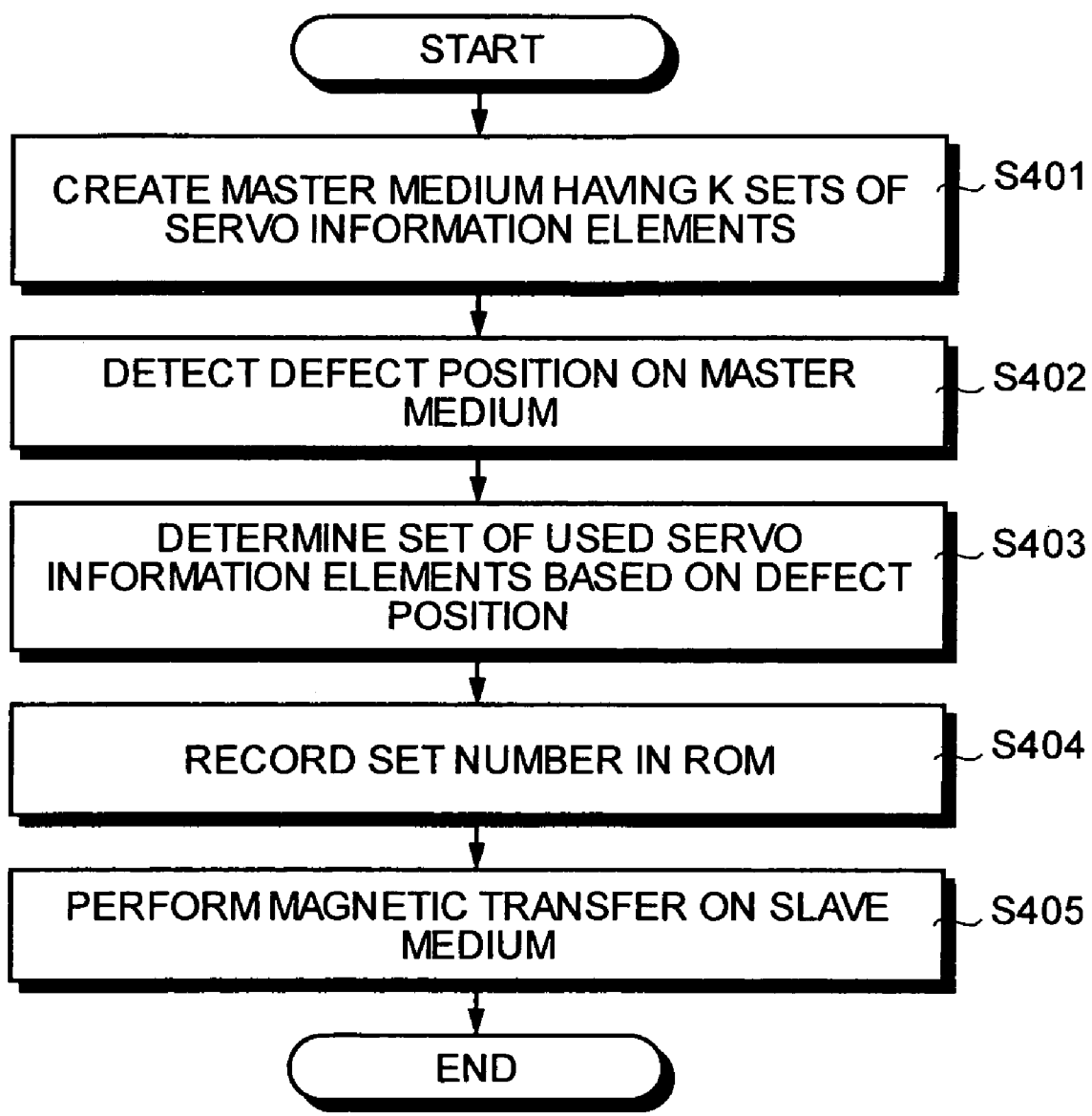
FIG. 4 is a flowchart of a magnetic transfer procedure according to the embodiment.

The magnetic transfer procedure according to the embodiment will be explained next. FIG. 4 is a flowchart of the magnetic transfer procedure according to the embodiment. As shown in FIG. 4, in the magnetic transfer, a master medium having K sets of pieces of servo information is created (step S401).

Figure 5:
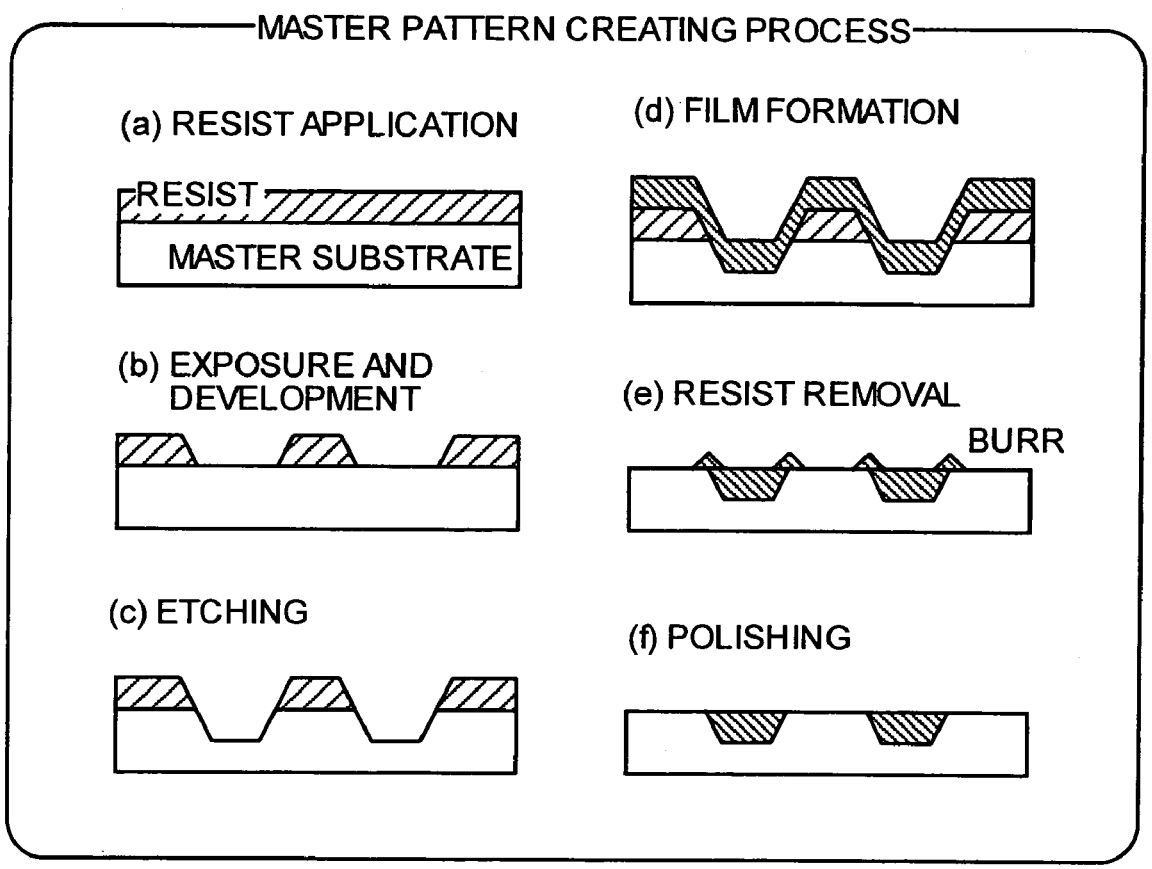
FIG. 5 is an explanatory diagram of a master pattern creating process.

As shown in FIG. 5, a creation of a master medium can be performed like the conventional master medium, namely, in the order of (a) resist application to a master base plate, (b) exposure/development, (c) etching, (d) film forming, (e) resist removal, and (f) polishing. A pattern formed on the master base plate becomes K times of a conventional pattern.

The defect-position detecting unit 110 of servo-information analyzing apparatus 100 detects a defect position on a master medium (step S402), the servo-information determining unit 130 determines a set of pieces of servo-information, based on the detected defect position (step S403), and the ROM writing unit 140 records the set number in the drive ROM 210 (step S404). Magnetic transfer is performed on a slave medium using the created master medium (step S405).

Thus, in the magnetic transfer, the magnetic-disk drive apparatus 200 incorporated with the drive ROM 210 can select a set of pieces of servo information that do not include any defect to perform servo control by creating a master medium having K sets of pieces of servo information, finding a set of pieces of servo information that does not include any defect from the K sets of pieces of servo information created, and recording a set number of the set, which does not include any defect, in the drive ROM 210.

Figure 6:
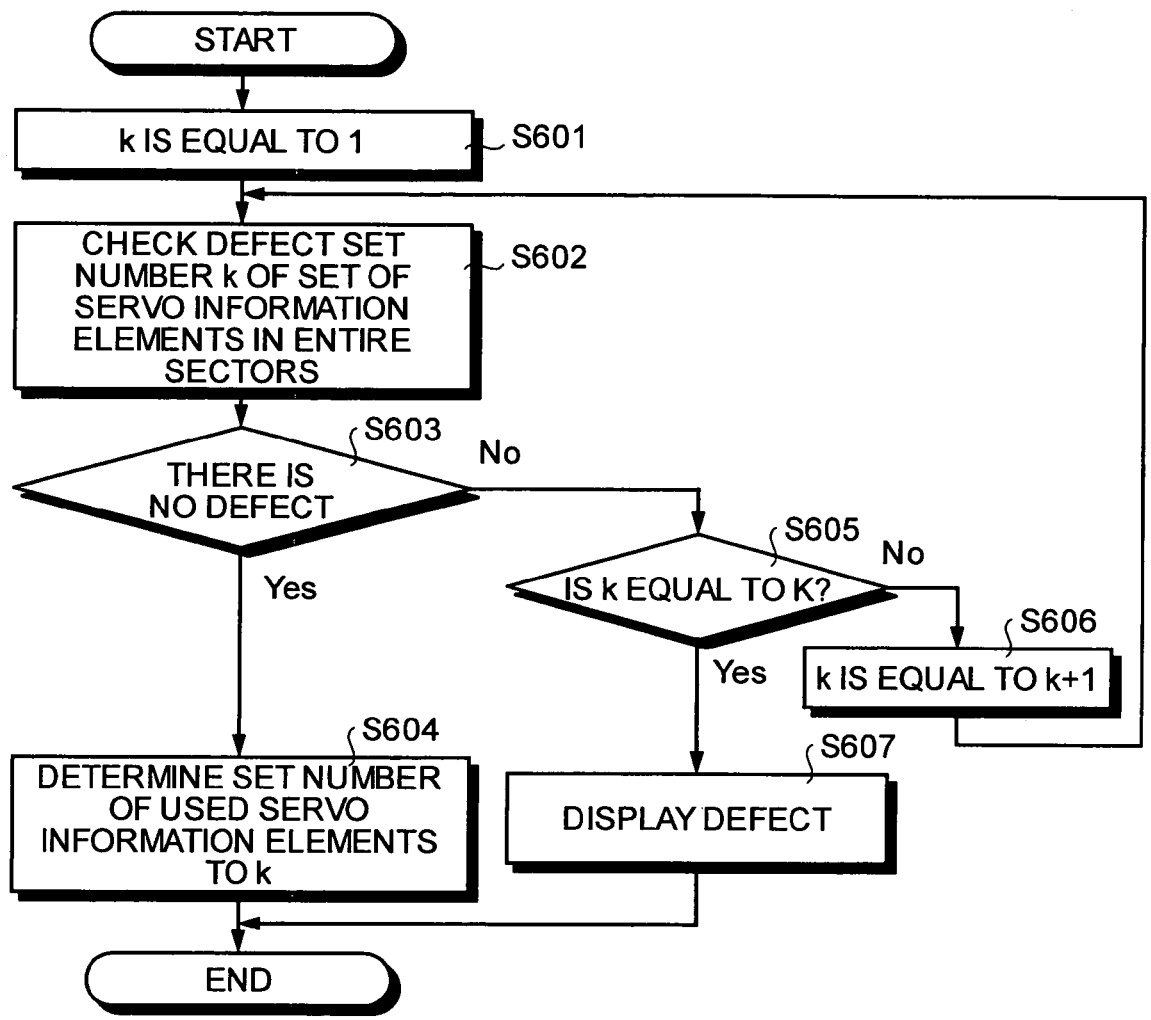
FIG. 6 is a flowchart of a processing procedure for a servo-information determining unit shown in FIG. 2.

FIG. 6 is a flowchart of a processing procedure in the servo-information determining unit 130 shown in FIG. 2. The processing in the servo-information determining unit 130 corresponds to the processing in step S403 in the magnetic transfer procedure shown in FIG. 4.

As shown in FIG. 6, the servo-information determining unit 130 initializes the set number k to "1" (step S601), checks a defect of the servo information element in the set number k regarding the entire the sectors (step S602), and determines presence of defects (step S603).

When there is not any defect, the set number of the servo information element to be used is determined to be k (step S604). On the other hand, when there is a defect, whether the entire K sets of pieces of servo information have been checked is determined (step S605). When the entire K sets of servo information element have not been checked, "1" is added to the k (step S606), and the processing returns back to step S602, where the next set number of servo information elements are checked.

When the entire K sets of pieces of servo information have been checked, since there is no set of pieces of servo information that has no defect, a defect is displayed (step S607) and the processing is completed.

While the case that magnetic transfer on a slave medium is conducted after defect position detection to a master medium is explained, a defect position to a master medium can be detected after magnetic transfer to a slave medium. Such a constitution can be employed that a defect position is detected to determine a set of pieces of servo-information by using a slave medium instead of the master medium.

Furthermore, instead of a defect position on a slave medium, a constitution can be employed so as to reproduce a signal of a slave signal to perform detection of servo information or measurement of servo characteristics, and determine a set of pieces of servo-information based on the detection result of the servo information or the measurement result of the servo characteristics.

FIG. 7 is a flowchart of a magnetic transfer procedure performed when a set of pieces of servo information to be used is determined based on servo characteristics of a slave medium. As shown in FIG. 7, in the magnetic transfer, a master medium having K sets of pieces of servo information is created (step S701).

Magnetic transfer to a slave medium is performed using the created master medium (step S702), and a signal of the slave medium is then reproduced to measure servo characteristics (step S703). A set of pieces of servo information that has the most favorable servo characteristic measured is determined as a set of pieces of servo-information (step S704), and a set number of servo information elements determined is recorded on the drive ROM 210 (step S705).

The magnetic-disk drive apparatus 200 can perform servo control using servo information elements with favorable servo characteristics by creating a slave medium from a master medium having K sets of pieces of servo information by utilizing magnetic transfer, reproducing servo information elements of the created slave medium to measure servo characteristics and determines a set of pieces of servo information having the most favorable servo characteristic as a set of pieces of servo-information.

FIG. 8 is a flowchart of a processing procedure for a servo-information determining processing based on servo characteristics. The servo-information determining processing based on servo characteristics corresponds to the processing in step S704 in the magnetic transfer procedure shown in FIG. 7.

As shown in FIG. 8, the servo-information determining processing first initializes k and Better to "1" (step S801). "k" stores a set number of a set of pieces of servo information being checked and Better stores a set number of a set of pieces of servo information having the most favorable servo characteristic of the sets of pieces of servo information that have been checked.

"1" is added to k (step S802), whether the servo characteristics of the set number k is more favorable than the servo characteristics of the set number Better (step S803). When the former is more favorable than the latter, it is set as Better=k (step S804). That is, a set number of a set of pieces of servo information with the most favorable servo characteristic of the servo information elements that have been checked is set to k.

Whether comparison to the entire K sets of pieces of servo information has been made regarding relative merits of servo characteristics is determined (step S805). When the comparison has not been made to the entire K sets of pieces of servo information regarding relative merits of servo characteristics, the processing returns back to step S802, where the servo characteristics in the next set number is compared with that in the set number Better. When the comparison has been made to the entire K sets of pieces of servo information regarding the servo characteristics, the set number Better is determined as a set number of a set of pieces of servo-information (step S806).

As described above, according to the embodiment, magnetic transfer is performed on a slave medium using a master medium recorded with K sets of pieces of servo information and a set of pieces of servo information that do not include any defect or a set of pieces of servo information that have the most favorable servo characteristic is determined from the K sets of pieces of servo information. Since the servo-gate generator 220 of the magnetic-disk drive apparatus 200 generates servo gates corresponding to recording positions of the determined set of pieces of servo information, and the servo controller 230 performs servo control corresponding to the servo gates, performance degradation and follow-up control failure due to defective servo information can be prevented.

While, according to the embodiment, the case that the same set of pieces of servo information are used to the entire tracks on the slave medium has been explained, the present invention is not limited to this case. Similarly, the invention can be applied to a case that different sets of pieces of servo information are used according to changes in radial positions.

FIGS. 9A and 9B are explanatory diagrams of a case that different sets of pieces of servo information are used according to changes in radial positions. As shown in FIGS. 9A and 9B, for example, tracks on a slave medium are classified to three classes according to a radial position, and different sets of pieces of servo information can be used for the respective classes. In such a case, the drive ROM stores set numbers of servo-information elements for the respective classes and the servo-gate generator generates different servo gates for the respective classes.

Figure 10:
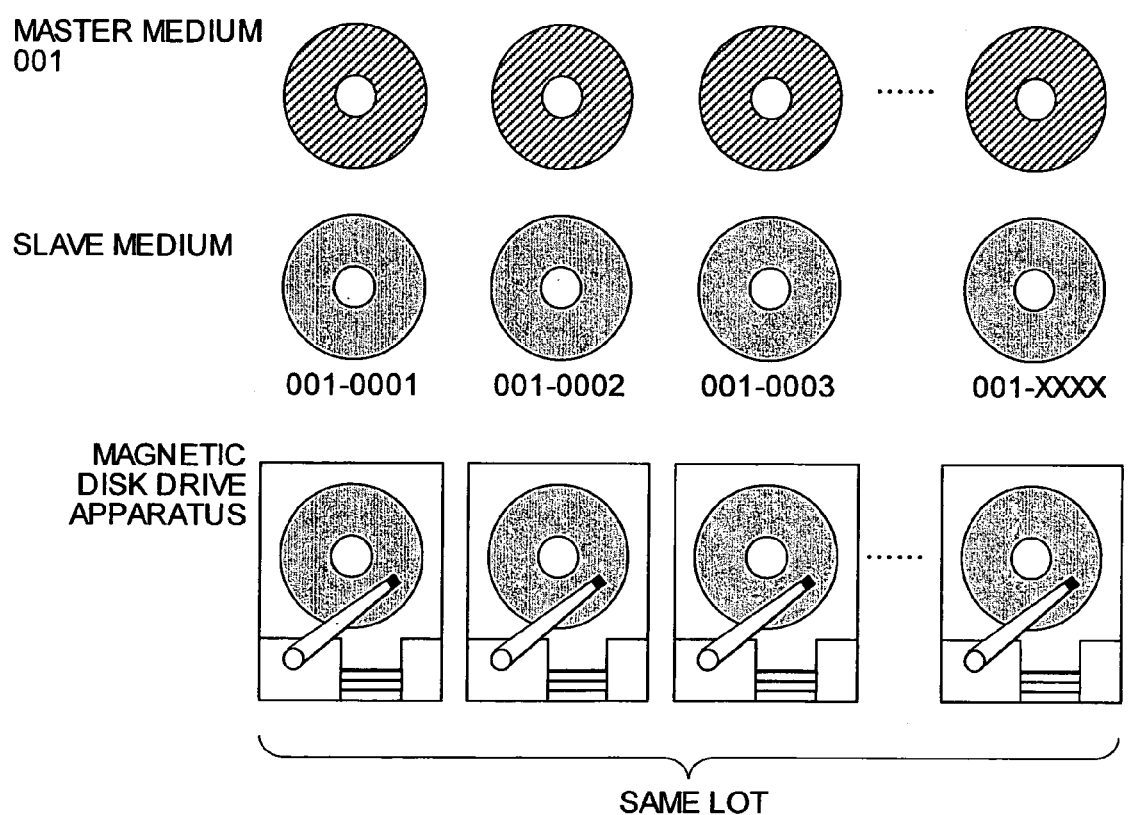
FIG. 10 is an explanatory diagram of magnetic-disk drive apparatuses included in the same lot.

Magnetic-disk drive apparatuses using the slave medium created from the same master medium constitute the same lot. FIG. 10 is an explanatory diagram of magnetic-disk drive apparatuses included in the same lot.

As shown in FIG. 10, magnetic-disk drive apparatuses using slave mediums "001-0001", "001-0002", . . . , "001-XXXX" created from a master medium "001" by magnetic transfer constitute the same lot.

In the magnetic transfer, the slave medium created from the same master have the same defect or the same servo characteristics. Therefore, the magnetic-disk drive apparatuses using the slave mediums "001-0001", "001-0002", . . . , "001-XXXX" can use the same set number of servo information elements by checking the master medium "001" to determine the set number of the servo-information elements.

By checking one slave medium, for example, the slave medium "001-0001" to determine a set number of a set of pieces of servo-information, all the magnetic-disk drive apparatuses using the slave mediums "001-0002", "001-0003", . . . , "001-XXXX" created using the same master medium "001" can use the same set number of the servo information elements.

As explained above, according to the present invention, since servo control is conducted using a set of pieces of servo information selected from a plurality of sets of pieces of servo information recorded on a recording medium, the quality of servo information used for the servo control is improved, and performance degradation and follow-up control failure due to defective servo information can be prevented.

Furthermore, according to the present invention, since an identifier of a set of pieces of servo information to be used for servo control is recorded from a plurality of sets of pieces of servo information recorded on a recording medium, a set of pieces of servo information to be used is selected from a plurality of sets of pieces of servo information using the recorded identifier, and a position of a head is controlled using the selected servo information elements, the quality of servo information used for the servo control is improved, and performance degradation and follow-up control failure due to defective servo information can be prevented.

Moreover, according to the present invention, since a set of pieces of servo information to be used is determined from a plurality of sets of pieces of servo information that a master medium has, transfer is conducted using the master medium, and a slave medium, on which the sets of pieces of servo information are recorded, is created, the quality of servo information used for the servo control is improved, and performance degradation and follow-up control failure due to defective servo information can be prevented.

Furthermore, according to the present invention, since transfer is conducted using a master medium having a plurality of sets of pieces of servo information, a slave medium, on which the sets of pieces of servo information are recorded, is created, and a set of pieces of servo information to be used is determined from the sets of pieces of servo information, the quality of servo information used for the servo control is improved, and performance degradation and follow-up control failure due to defective servo information can be prevented.

Moreover, according to the present invention, since a plurality of sets of pieces of servo information are recorded, a set of pieces of servo information selected based on a check result of the sets of pieces of servo information recorded are used for positioning a magnetic head by a magnetic-disk drive apparatus, the quality of servo information used for the servo control is improved, and performance degradation and follow-up control failure due to defective servo information can be prevented.

Furthermore, according to the present invention, since a defect on a medium having a plurality of sets of pieces of servo information is detected, and a set of pieces of servo information to be used is selected from the sets of pieces of servo information based on a position of the defect, the quality of servo information used for the servo control is improved, and performance degradation and follow-up control failure due to defective servo information can be prevented.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A disk drive apparatus that performs a positioning of a head based on servo information recorded on a recording medium, the disk drive apparatus comprising a servo control unit that performs a servo control based on a set of pieces of servo information selected from a plurality of sets of pieces of servo information recorded on the recording medium, and wherein the recording medium is classified into a plurality of zones according to a distance from a center of the recording medium and the servo control unit can select a different set of pieces of servo information for each of the classified zones.

2. The disk drive apparatus according to claim 1, further comprising a servo-gate generating unit that generates a servo gate, wherein the servo control unit selects the set of pieces of servo information to be used by using the servo gate generated.

3. The disk drive apparatus according to claim 1, wherein said classified zones are annular-shaped and are adjacent to each other.

4. A servo control circuit for a disk drive apparatus, the servo control circuit comprising:

a servo-information-identifier storing circuit that stores an identifier for identifying a set of pieces of servo information to be used for the servo control from among a plurality of sets of pieces of servo information recorded on a recording medium;

a servo-information selecting circuit that selects the set of pieces of servo information to be used from among the sets of pieces of servo information based on the identifier stored; and a position control circuit that controls a position of a head of the disk drive apparatus based on the set of pieces of servo information selected, and wherein the recording medium is classified into a plurality of zones according to a distance from a center of the recording medium and a servo-information-identifier storing circuit stores an identifier for identifying a different set of pieces of servo information for each of the classified zones.

5. The servo control circuit for a disk drive apparatus according to claim 4, wherein said classified zones are annular-shaped and are adjacent to each other.

6. A method of manufacturing a recording medium, the method comprising:

a determining step of determining a set of pieces of servo information to be used from a plurality of sets of pieces of servo information that are recorded on a master medium; and after said determining step, creating a slave medium on which the sets of pieces of servo information are recorded by transferring the sets of pieces of servo information by using the master medium.

7. A method of manufacturing a recording medium, the method comprising:

creating a slave medium on which a plurality of sets of pieces of servo information are recorded by transferring the sets of pieces of servo information using a master medium on which the sets of pieces of servo information are recorded; and determining, from said master medium, a set of pieces of servo information to be used from the sets of pieces of servo information.

* * * * *